O. G. LUYTIES.
AUTOMOBILE SEARCH LIGHT.
APPLICATION FILED DEC. 18, 1912.

1,095,583.

Patented May 5, 1914.

WITNESSES:

INVENTOR

UNITED STATES PATENT OFFICE.

OTTO G. LUYTIES, OF SHARON SPRINGS, NEW YORK.

AUTOMOBILE SEARCH-LIGHT.

1,095,583.  Specification of Letters Patent.  Patented May 5, 1914.

Application filed December 18, 1912. Serial No. 737,490.

*To all whom it may concern:*

Be it known that I, OTTO G. LUYTIES, a citizen of the United States, and a resident of Sharon Springs, in the county of Schoharie and State of New York, have invented a certain new and useful Automobile Search-Light; of which the following is a specification.

This invention relates to automobile search-lights. It has for its object the production of an improved searchlight which will light up the road in front of an automobile without blinding persons who meet the car on the road.

Automobile searchlights, as at present constructed, are actually a source of danger. A person suddenly meeting an automobile on a dark road sees only two very large lights of blinding brightness. Being unable to see the details of the approaching car and, therefore, unable to tell the exact direction in which the automobile is headed, a pedestrian may step directly into its path instead of away from it. The momentary blinding effect at present is so pronounced that the pedestrian may fall into an unseen excavation or be run over by an unnoticed unlighted vehicle.

The reflectors at present in use are generally essentially parabolic or paraboloid tending to throw reflected rays of light forward in approximately parallel or slightly diverging lines. Looking at the searchlight from the front an observer sees light reflected and diffused from all parts of the mirror, the effect from a slight distance being, roughly speaking, that of a very large light equal in size to the diameter of the reflector.

Applicant's invention contemplates the use of a special shield reducing the apparent size of the light to a fractional part of its present area, the use of a special reflector and means for producing an illuminated background.

Figure 1:
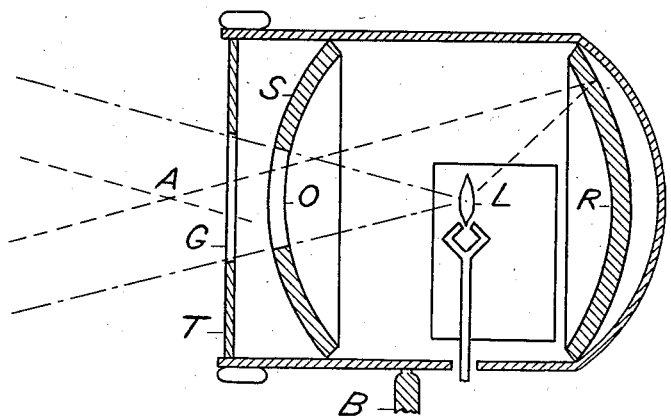
Figure 2:
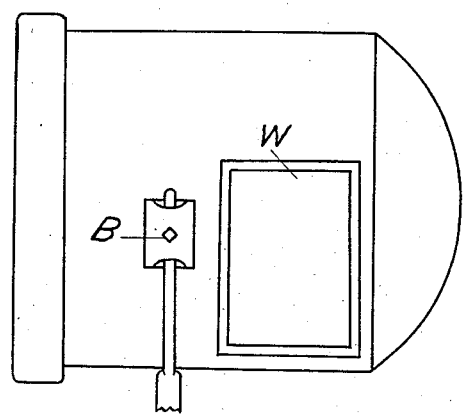
Figure 3:
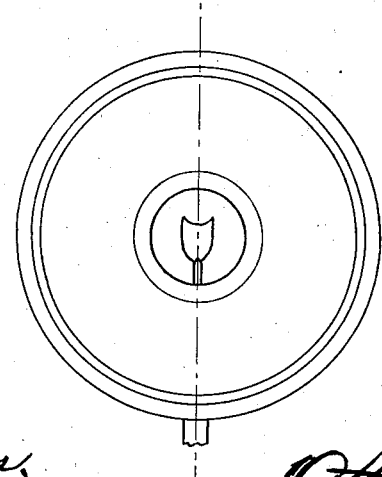

In the drawings Figure 1 shows a section of the new searchlight, Fig. 2 a side elevation and Fig. 3 a front elevation.

Referring to Fig. 1, S. represents a shield having an opening O, the area of which is only a fractional part of the area of the reflector R. L. represents a light for instance, an acetylene flame. The reflector R. is approximately ellipsoidal, one focus of the ellipsoid being at the flame and the other preferably at A. just in front of the opening in the shield. The reflected rays of light cross one another at or near the point A, passing through the opening of the shield and forming a cone of light in front.

The shield to be effective must be non-transparent except at its center. It may be more or less translucent or entirely opaque. The shield may be made to serve as an auxiliary reflector by polishing its inner surface and if made of glass by silvering it on the side away from the light. The shield may be made spherical with a radius approximately equal to its distance from the light or with a slightly larger radius. A considerable part of the light reflected by the shield will then be again reflected from the rear mirror of the searchlight and find its way out through the front opening. It is further preferable to make the inside of the cylindrical portion of the searchlight of polished metal. The center of the shield must be transparent, being either cut away or made of glass. It is desirable to make it literally an opening, if structurally convenient, and if there is not too much draft on the light. The size of the opening is determined by the desired angle of the cone of light formed by rays coming directly from the flame. The aperture in the shield may be for instance somewhat less than one third the diameter of the rear mirror.

An observer looking into applicant's searchlight sees only a small portion of the main reflector at one time instead of essentially the whole reflector as in lights now in general use. As seen from a slight distance the total bright area of applicant's searchlight may, for instance, be only one tenth as great as the total bright area of an ordinary searchlight of the same internal diameter. The apparent small size of applicant's searchlight makes it less terrifying to pedestrians and horses than an ordinary light. In addition to this as the cone of rays coming directly from the flame is much narrower than usual, an observer standing a little to one side will not see the flame itself at all.

In the drawings G. represents a front glass having a transparent center and a surrounding translucent annular portion T. This translucent ring serves to intercept stray rays of light and is only faintly illuminated mainly by light reflected from the inner walls of the searchlight. An observer who sees the translucent ring without seeing a bright light at its center is well aware of the approach of the automobile and yet knows at once that he is out of the direct path of the light.

Having thus described my invention what I claim and desire to secure by Letters Patent is:

1. An automobile searchlight having a light and a rear reflector and a spherical front reflector, said front reflector having a central transparent portion.

2. An automobile searchlight having an ellipsoidal rear reflector and a spherical front reflector of a radius greater than its distance from the light said front reflector having a transparent central portion of less diameter than the rear reflector.

3. An automobile searchlight having a light and a non-transparent front shield with a transparent central portion, and an ellipsoidal reflector of such curvature that one focus of the ellipsoid is at the light and the other focus is a short distance in front of the transparent portion of the shield.

4. In an automobile searchlight, in combination, a light, a reflector, and a non-transparent shield in front of the light having a relatively small central portion permitting light to pass and a glass in front of said shield transparent at its center and otherwise translucent.

5. In an automobile searchlight in combination a light, an ellipsoidal reflector, and a front glass with a transparent portion about the axis of the ellipsoid, said front glass having a translucent portion surrounding its transparent portion, the light being located at one focus of the ellipsoid and the front glass being located near the other focus of the ellipsoid.

6. In an automobile head-light in combination, a light, a curved rear reflector, and a front glass having a translucent annular portion surrounding a relatively small central transparent portion.

7. A vehicle head-light having a light and a rear reflector and a translucent spherical front reflector, said front reflector having a central transparent portion.

8. A vehicle head-light having in combination, a light, a curved rear reflector and a translucent front with a central transparent portion, said combination being adapted to project a beam of reflected light surrounded by diffused light.

Signed at New York in the county of New York and State of New York this 9th day of December A. D. 1912.

OTTO G. LUYTIES.

Witnesses:
L. McAndrews,
Joseph O'Brien.